Aug. 11, 1936.  A. L. FREEDLANDER  2,050,489
V-BELT
Original Filed July 13, 1931  2 Sheets-Sheet 1

INVENTOR
ABRAHAM L. FREEDLANDER,
BY
ATTORNEYS

Aug. 11, 1936.　　　A. L. FREEDLANDER　　　2,050,489

V-BELT

Original Filed July 13, 1931　　　2 Sheets-Sheet 2

INVENTOR
ABRAHAM L. FREEDLANDER,
BY
ATTORNEYS

Patented Aug. 11, 1936

2,050,489

UNITED STATES PATENT OFFICE 2,050,489

V-BELT

Abraham L. Freedlander, Dayton, Ohio, assignor to The Dayton Rubber Manufacturing Company, Dayton, Ohio, a corporation of Ohio Original application July 13, 1931, Serial No. 550,478. Divided and this application October 3, 1932, Serial No. 635,968

9 Claims. (Cl. 154—4)

My invention relates to belts and in particular to belts composed of a plurality of layers of concentrically wound sheets of rubberized or rubber impregnated fabric.

It is the object of my invention to provide a method of forming a belt so that resistance to flexing transversely will be inherent in the belt structure in accordance with the arrangement of the layers of the belt or resistance to bending may be likewise secured by arranging the layers of the belt material.

It is a further object to provide a method of forming a belt comprising rolling concentrically of a strip of rubber impregnated fabric, molding it by one or more operations so as to arrange the layers of fabric in planes to resist the flexing of the belt as desired without disturbing the flexing of the belt in other directions, and in some cases of forming teeth in the belt so arranged by severing portions of the belt so molded.

It is an additional object thereby to use cheap straight laid fabric and of quickly and economically producing a belt of the desired cross section.

One of the primary objects of my invention is to provide a structure that is so internally braced by the arrangement of the layers of fabric that the tendency of the belt to twist torsionally about its longitudinal axis and thereby roll over in the groove in the pulley will be prevented, particularly when there is a movement of one pulley on which the belt is mounted out of alignment with another pulley on which the belt is mounted as in the case of generator drives on railway cars where the generator is fixed beneath the car body and the truck is pivoted to the car body.

This application is a division of my application Serial No. 550,478, filed July 13, 1931 now Patent 1,989,168 dated January 29, 1935.

Referring to the drawings, Figure 1 is an end elevation of the concentrically wound roll of rubberized fabric.

Figure 1:
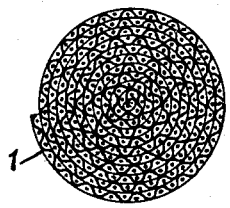
Figure 2:
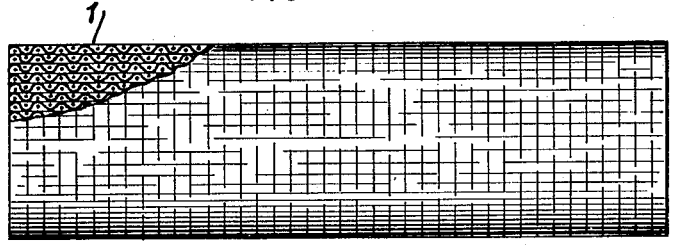
Figure 2 is a side elevation thereof.

Referring to the drawings in detail, 1 indicates a strip of straight laid woven textile material constituting a fabric which is impregnated with rubber. Its preferable condition is somewhat sticky or tacky so that when rolled concentrically as in Figure 1 it will remain in that rolled condition, while at the same time will be sufficiently pliable to be molded into any desired cross section.

I have found that by arranging the layers of this concentrically wound sausage-like raw stock in given planes by molding that I am enabled to control the resistance to forces applied to the belt, depending upon its application to a drive.

Figure 3:
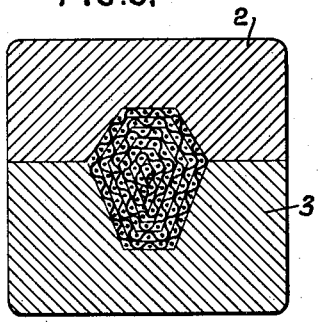
Figure 3 is a section through the mold showing the molding of the cylindrical raw stock roll 2 into the proper configuration desired with the arrangement of the layers of the fabric generally vertical to resist excessive bending.
Figure 5:
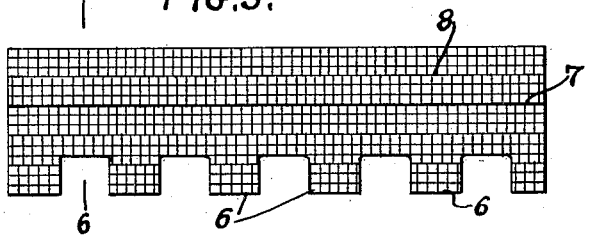
Figure 5 is a side elevation of the belt.
Figure 6:
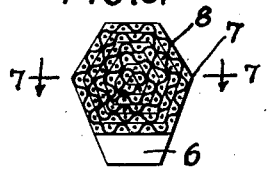
Figure 6 is a section on the line 6—6 of Figure 5.
Figure 7:
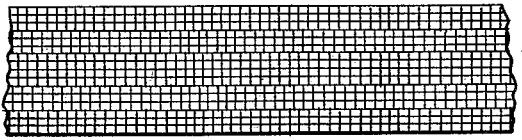
Figure 7 is a section on the line 7—7 of Figure 6.
Figure 4:
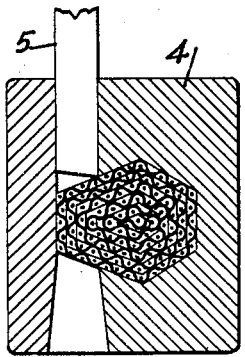
Figure 4 illustrates diagrammatically the method of severing teeth from the lower portion of the belt to permit it to bend more readily over short center drives and small pulleys.
Figure 8:
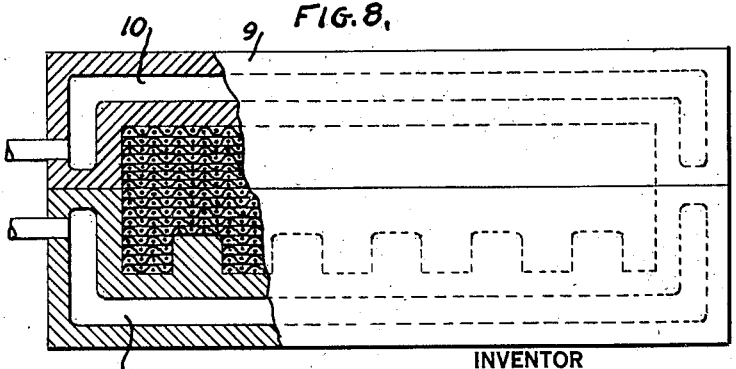
Figure 8 shows the vulcanizing mold partially in section with the belt partially in section.

In Figure 3, for instance, the mold halves 2 and 3 are so arranged that upon molding the belt raw stock shown in Figure 1, the layers will be arranged substantially in the vertical. This results in a belt that is laterally flexible but resists bending. If desired, in order to provide for a belt that is thus stiffened that will still pass over small pulleys, teeth may be formed in the underside of the belt by placing the belt in the supporting holder 4 and shearing portions therefrom to form teeth by the knife 5. The result is shown in Figures 5 and 6 where teeth 6 are formed on the lower side of the belt.

Furthermore, a large portion of rigid material is provided above the corner 7 on the belt as at 8 which gives the belt such a construction that it will resist torsional twist and resist rolling over in the pulleys which action reduces its driving capacity or causes the belt to roll out of the pulleys.

After molding the belt or molding it and severing the teeth from it, the belt is placed in a vulcanized mold 9 having steam chambers 10 and vulcanized.

Figure 9:
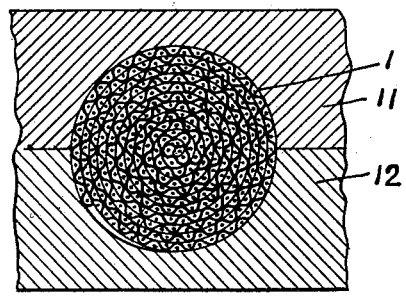
Figure 9 is a section through a circular mold and the belt to bring it to circular form in order to have it of uniform diameter.
Figure 10:
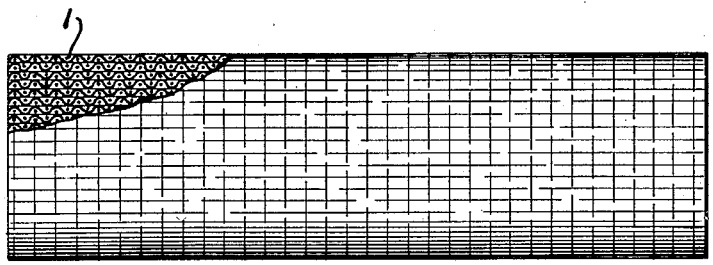
Figure 10 is a side elevation of the belt as so formed.
Figure 11:
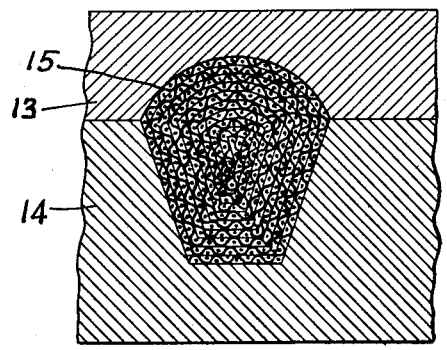
Figure 11 is a section through a mold which imparts to the lower portion of the belt such a form that it will fit into a V-shaped pulley with the layers of belt material generally vertical while the upper portion of the belt has the layers generally horizontal, forming an arch-shaped brace against transverse compression.
Figure 12:
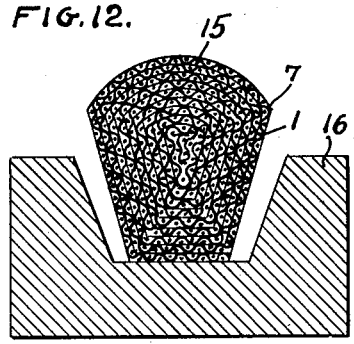
Figure 12 shows the belt formed in Figure 11 in the mold prior to molding to impart to the belt a form in which the major portion of the layers will be horizontal, or at least a sufficient number to prevent undue transverse flexing and in particular to prevent rolling or twisting of the belt.
Figure 13:
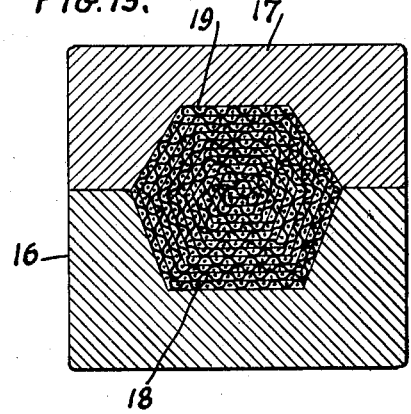
Figure 13 shows the mold and belt in section as molded.

Referring to Figure 9 and Figure 10, it is sometimes necessary in providing a very accurate belt to bring the belt to size by employing a mold such as the mold halves 11 and 12 or the mold halves 13 and 14.

When the mold halves 13 and 14 are utilized, the lower portion of the belt is arranged with the layers of fabric material substantially vertical while the upper layers as at 15 are substantially horizontal, or at least arch-shaped to prevent and resist longitudinal compression.

This belt may then be laid in the larger mold 16 which has the cover 17 and, when compressed to shape, it will have two groups of layers 18 and 19 arranged horizontally transversely of the belt to resist the twisting and rocking of the belt and its rolling.

Figure 14:
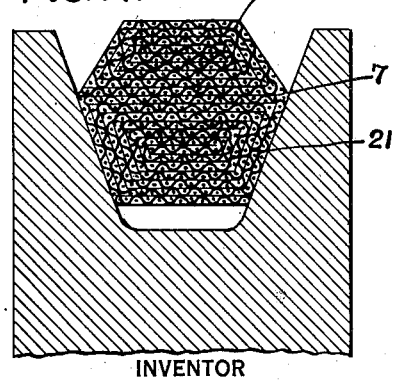
Figure 14 is a section through a belt so molded comprised of two separate cylindrical bodies of concentrically wound rubberized fabric.

In the form shown in Figure 14 two circular members such as 1 may be superimposed on one another as at 20 and 21 and brought to shape in the mold, thus giving a rigid transverse structure that will prevent torsional twist while at the same time permitting a reasonable degree of flexibility.

By providing a substantial portion of the belt above the corner 7, it is possible to secure great structural strength of the belt with the maximum driving power, and also to prevent the turning-over of the belt when the pulleys are out of line, since the corner edge 7 is thereby stiffened.

It will be understood that the "plane of the belt" refers to the plane which the belt includes when its ends are joined to make it endless; also that the term "radial" refers to a direction within this plane and passing outward from the inner surface of the belt, the latter being the surface facing the bottom of the pulley groove; also that the term "axial" refers to a direction perpendicular to the plane of the belt as defined above.

It will be understood that I desire to comprehend within my invention such modifications as may be clearly embraced within my claims and the scope of my invention.

Having thus fully described my invention, what I claim as new and desire to secure by Letters Patent, is:

1. In a method of manufacturing a belt, rolling a sheet of rubber-impregnated fabric upon itself from the center outwardly into a body with spirally-curved layers only, and moulding the body in moulds of polygonal cross section, to thus change its cross-sectional shape and re-arrange the layers of fabric in planes to resist the layer stresses applied to the belt.

2. In a method of manufacturing a belt, rolling a strip of fabric impregnated with rubber upon itself in spirally-curved layers to form a generally cylindrical body, and molding that body into polygonal cross-sectional form to rearrange the layers of the lower half of the body into preponderately vertical planes and the layers in the upper half into preponderately horizontal planes.

3. In a method of manufacturing a belt, rolling a strip of fabric impregnated with rubber concentrically to form a generally cylindrical body, molding that body with the lower half of the layers arranged substantially vertically, and the upper layers arranged horizontally, and again molding the belt to reduce the vertical dimension of the belt, extend the belt laterally and arrange a substantial portion of the layers above and below the center of the belt in horizontal planes.

4. In a method of forming a belt, rolling a strip of rubber impregnated fabric upon itself in spirally-curved layers to form a body of cylindrical cross section, applying a second cylindrical body of similar character to one side of the first body and molding the two bodies together to transform their cross-sectional shapes into a combined body of approximately hexagonal shape.

5. In a method of forming a belt, rolling a strip of rubber impregnated fabric upon itself in spirally-curved layers to form a body of cylindrical cross section, applying a second cylindrical body of similar character to one side of the first body and molding the two bodies together to transform their cross-sectional shapes into a combined body of approximately hexagonal shape, the fabric layers being so arranged during the molding that a predominant proportion of the layers of the belt so formed will be in parallel planes.

6. In a method of forming a belt, rolling concentrically upon itself a strip of rubberized fabric and compressing said roll of fabric into hexagonal section having a flat top and flat bottom and V-shaped sides for the belt, and by so molding the belt arranging the layers of fabric to a substantial amount in horizontal planes above and below the center line of the belt.

7. A method of manufacturing belts which consists of rolling a sheet of rubber-impregnated fabric upon itself in spirally-curved layers to form a body of approximately circular cross section, reshaping the body while cold into polygonal cross-sectional form to rearrange the fabric layers on the inner part of the body into a substantially radial position, and the fabric layers on the outer part of the body into substantially an axial position, and then pressing and vulcanizing the body thus shaped.

8. A method of manufacturing belts which consists of rolling a sheet of rubber-impregnated fabric upon itself in spirally-curved layers to form a body of approximately circular cross section, reshaping the body into roughly hexagonal form by moving approximately the inner half of the fabric layers into substantially radial positions and approximately the outer half of the fabric layers into substantially axial positions, and then pressing and vulcanizing the thus shaped body.

9. A method of manufacturing belts which consists of rolling a sheet of rubber-impregnated fabric upon itself in spirally-curved layers to form a body of approximately circular cross section, rearranging the fabric layers on the inner part of the body into substantially a radial position and the fabric layers on the outer part of the body into substantially an axial position by reshaping the body while cold, and then pressing and vulcanizing the body thus shaped.

ABRAHAM L. FREEDLANDER.